US008290724B2

(12) United States Patent
Darbin et al.

(10) Patent No.: US 8,290,724 B2
(45) Date of Patent: Oct. 16, 2012

(54) METHOD AND APPARATUS FOR CONTROLLING DIAPHRAGM DISPLACEMENT IN SYNTHETIC JET ACTUATORS

(75) Inventors: Stephen P. Darbin, Austin, TX (US); Markus Schwickert, Austin, TX (US); John Stanley Booth, Austin, TX (US); Robert Taylor Reichenbach, Pflugerville, TX (US); Rick Ball, Austin, TX (US); Steve Farrell, Austin, TX (US); Daniel W. McFatter, San Marcos, TX (US)

(73) Assignee: Nuventix, Inc., Austin, TX (US)

( * ) Notice: Subject to any disclaimer, the term of this patent is extended or adjusted under 35 U.S.C. 154(b) by 834 days.

(21) Appl. No.: 12/291,337

(22) Filed: Nov. 6, 2008

(65) Prior Publication Data

US 2009/0141065 A1 Jun. 4, 2009

Related U.S. Application Data

(60) Provisional application No. 61/002,237, filed on Nov. 6, 2007.

(51) Int. Cl.
*B41J 29/393* (2006.01)
*G06F 17/00* (2006.01)

(52) U.S. Cl. ................ 702/57; 702/64; 702/65; 702/56; 702/107; 347/19

(58) Field of Classification Search .................... 702/57, 702/65, 64, 54, 56, 107
See application file for complete search history.

(56) References Cited

U.S. PATENT DOCUMENTS

| | | | | |
|---|---|---|---|---|
| 5,483,060 | A | 1/1996 | Sugiura et al. | |
| 6,463,211 | B1 * | 10/2002 | Peritore et al. | 318/400.34 |
| 6,735,540 | B2 | 5/2004 | Pedrazzini et al. | |
| 7,092,196 | B2 | 8/2006 | Eaton et al. | |
| 2007/0023169 | A1 * | 2/2007 | Mahalingam et al. | 165/104.28 |
| 2007/0081027 | A1 | 4/2007 | Beltran et al. | |
| 2007/0096118 | A1 | 5/2007 | Mahalingam et al. | |
| 2007/0119573 | A1 * | 5/2007 | Mahalingam et al. | 165/80.4 |
| 2007/0119575 | A1 | 5/2007 | Glezer et al. | |
| 2007/0127210 | A1 | 6/2007 | Mahalingam et al. | |
| 2007/0141453 | A1 | 6/2007 | Mahalingam et al. | |
| 2008/0043061 | A1 * | 2/2008 | Glezer et al. | 347/53 |

FOREIGN PATENT DOCUMENTS

WO WO 2007/100645 A2 9/2007

OTHER PUBLICATIONS

PCT Search Report, Jan. 6, 2009, Nuventix, Inc.

* cited by examiner

*Primary Examiner* — Hal Wachsman

(74) *Attorney, Agent, or Firm* — John A. Fortkort; Fortkort & Houston P.C.

(57) ABSTRACT

A method for calibrating a synthetic jet ejector is provided. The method includes (a) taking a first measurement $DCR_0$ of the DC resistance of the coil; (b) adjusting the actuator drive voltage $V_d$ to achieve a desired maximum displacement $d_{max1}$ at a frequency $f_1$; (c) measuring the input current $I_{in}$ and input voltage $V_{in}$; (d) calculating the back electromagnetic frequency $B_{EMF}$, wherein $B_{EMF}=V_{in}-I_{in}*DCR$; and (e) storing the calculated value of $B_{EMF}$ in a memory device associated with the synthetic jet actuator.

26 Claims, 10 Drawing Sheets

METHOD AND APPARATUS FOR CONTROLLING DIAPHRAGM DISPLACEMENT IN SYNTHETIC JET ACTUATORS

CROSS-REFERENCE TO RELATED APPLICATION

This application claims the benefit of priority from U.S. Provisional Application No. 61/002,237, filed Nov. 6, 2007, having the same title, and having the same inventors, and which is incorporated herein by reference in its entirety.

FIELD OF THE DISCLOSURE

The present disclosure relates generally to synthetic jet actuators, and more particularly to methods and devices for controlling diaphragm displacement in synthetic jet actuators.

BACKGROUND OF THE DISCLOSURE

A variety of thermal management devices are known to the art, including conventional fan based systems, piezoelectric systems, and synthetic jet actuators. The latter type of system has emerged as a highly efficient and versatile solution where thermal management is required at the local level. Frequently, synthetic jet actuators are utilized in conjunction with a conventional fan based system. In such hybrid systems, the fan based system provides a global flow of fluid through the device being cooled, and the synthetic jet ejectors provide localized cooling for hot spots and also augment the global flow of fluid through the device by perturbing boundary layers.

Various examples of synthetic jet actuators are known to the art. Some examples include those disclosed in U.S. 20070141453 (Mahalingam et al.) entitled "Thermal Management of Batteries using Synthetic Jets"; U.S. 20070127210 (Mahalingam et al.), entitled "Thermal Management System for Distributed Heat Sources"; 20070119575 (Glezer et al.), entitled "Synthetic Jet Heat Pipe Thermal Management System"; 20070119573 (Mahalingam et al.), entitled "Synthetic Jet Ejector for the Thermal Management of PCI Cards"; 20070096118 (Mahalingam et al.), entitled "Synthetic Jet Cooling System for LED Module"; 20070081027 (Beltran et al.), entitled "Acoustic Resonator for Synthetic Jet Generation for Thermal Management"; and 20070023169 (Mahalingam et al.), entitled "Synthetic Jet Ejector for Augmentation of Pumped Liquid Loop Cooling and Enhancement of Pool and Flow Boiling".

SUMMARY OF THE DISCLOSURE

Figure 1:
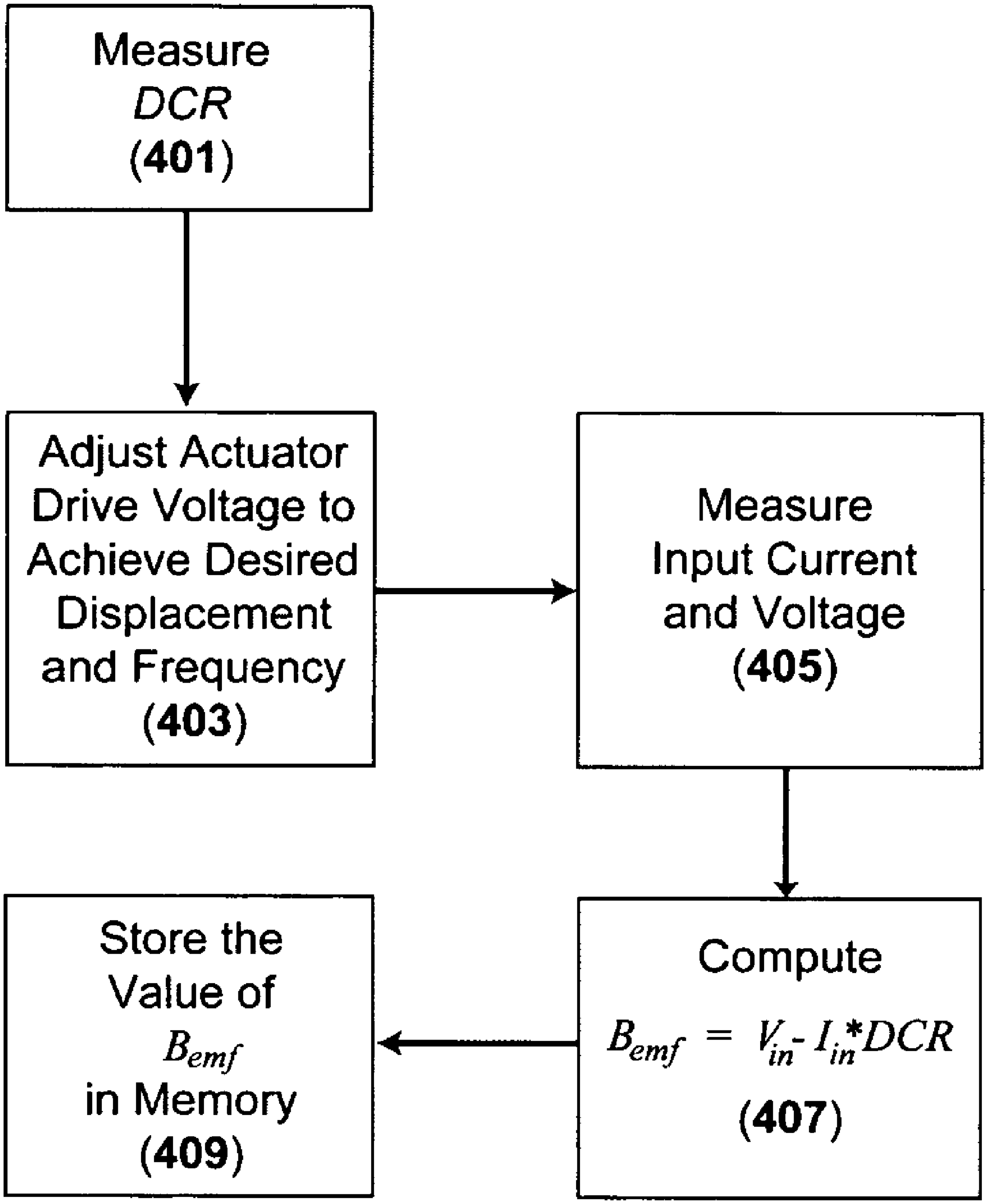
FIG. 1 is a flow chart illustrating a particular, non-limiting embodiment of a method in accordance with the teachings herein.

In one aspect, a method for calibrating a synthetic jet ejector is provided which comprises (a) taking a first measurement $DCR_0$ of the dc resistance of the coil; (b) adjusting the actuator drive voltage $V_d$ to achieve a desired maximum displacement $d_{max1}$ at a frequency $f_1$; (c) measuring the input current $I_{in}$ and input voltage $V_{in}$; (d) calculating the Back Electromotive Force $B_{EMF}$, wherein $B_{EMF}=V_{in}-I_{in}*DCR$; and (e) storing the calculated value of $B_{EMF}$ in a memory device associated with the synthetic jet actuator.

In another aspect, a method for calibrating a synthetic jet ejector is provided which comprises (a) providing a synthetic jet ejector equipped with a coil, wherein the coil causes a diaphragm to vibrate about a first axis which is perpendicular to a major surface of the diaphragm; (b) applying a periodic force such that the diaphragm is deflected from a resting position to a maximum displacement $d_0$ along the first axis, wherein $d_0$ is equal to the desired displacement of the diaphragm during operation of the synthetic jet ejector; and (c) measuring the $B_{EMF}$ voltage across the coil.

In a further aspect, a method for determining the $B_{EMF}$ in a coil of a synthetic jet ejector is provided which comprises (a) providing a synthetic jet ejector equipped with a first coil, wherein the first coil causes a diaphragm to vibrate about a first axis which is perpendicular to a major surface of the diaphragm; (b) providing a second coil; and (c) using the second coil to determine $B_{EMF}$.

In still another aspect, a method for determining $B_{EMF}$ in a synthetic jet ejector having coupled first and second actuators is provided. The method comprises (a) deactivating the first actuator while operating the second actuator, thereby placing the synthetic jet ejector into a first operational state; (b) determining the Back EMF ($B_{EMF1}$) of the first actuator while the synthetic jet ejector is in the first operational state; (c) deactivating the second actuator while operating the first actuator, thereby placing the synthetic jet ejector into a second operational state; and (d) determining the Back EMF ($B_{EMF2}$) of the second actuator while the synthetic jet ejector is in the second operational state.

In a further aspect, a method is provided for determining DC resistance (DCR) in an actuator coil for a synthetic jet ejector while the ejector is operating. In accordance with the method, DCR is determined by from dynamic impedance measurements at one or more frequencies outside of the normal operating range. For example, DCR may be determined at 10 Hz, and preferably, from dynamic impedance measurements at both 10 Hz and 20 Hz. Even more preferably, DCR is determined in accordance with the equation $DCR=Z(10\ Hz)-(Z(10\ Hz)-Z(20\ Hz))/3$.

In still another aspect, a method for monitoring resonance frequency in a synthetic jet ejector equipped with an actuator coil is provided. In accordance with the method, the phase of input impedance in the actuator coil is monitored. The resonance frequency is then determined by identifying the point at which the phase of the input impedance changes sign, and preferably, as the point at which the phase of the input impedance changes from positive to negative.

In a further aspect, a method for monitoring the phase relationship between two or more actuators in a multiple actuator system is provided. In accordance with the method, the phase of the calculated Back EMF signal of each actuator is monitored by recording the location of the negative-going zero-crossing of the waveform. The phase of each actuator drive signal is then modified such that the zero-crossings of all Back EMF signals occur simultaneously, thus matching the phase of all actuators within the system.

In yet another aspect, a synthetic jet ejector is provided which comprises (a) a diaphragm which undergoes displacements along an axis perpendicular to the surface of the diaphragm in response to a magnetic field; and (b) a sensor which senses the displacement of the diaphragm along the axis; wherein the diaphragm is driven by a magnetic field, and wherein the synthetic jet ejector is adapted to adjust the magnetic field in response to the sensed displacement of the diaphragm. In some embodiments, the sensor may comprise a capacitive plate, the magnetic field may be generated at least partially by a magnetic coil, and the plate may be capacitively coupled to the magnetic coil. In other embodiments, the sensor may be an optical sensor, and the synthetic jet ejector may further comprise a diode which is in optical communication with the sensor. In some such embodiments, the diode may be in optical communication with the sensor by way of an optical path, and the sensor may operate by sensing the degree to which the optical path is blocked. In other such embodiments, the diode may be in optical communication with the sensor by way of an optical path which includes a surface of the diaphragm, and wherein the sensor may operate by measuring the angle of incidence and the angle of reflection of radiation emitted by the diode which impinges on the diaphragm.

DETAILED DESCRIPTION

While the aforementioned synthetic jet actuators represent notable advances in the art, further improvements are still required in synthetic jet actuator technology. For example, many synthetic jet actuators are currently designed to operate with predetermined diaphragm displacements. These predetermined displacements typically do not take into account variations in environmental factors such as temperature, nor do they account for deviations in operational frequency or other such parameters which may occur as the device ages. Moreover, the predetermined displacements are typically based on the averages of various engineering parameters, and hence do not reflect deviations within manufacturing tolerances for a specific device.

Consequently, many synthetic jet actuators function at diaphragm displacements which are suboptimal in terms of the prevailing operational characteristics of the device at a given time and in terms of the efficiency at which the device can dissipate heat. Many of these devices also operate at diaphragm displacements which are suboptimal in terms of power consumption. In extreme cases, the actuator may be driven at diaphragm displacements which exceed maximum safe ranges, with the result that the diaphragm may come into contact with adjacent surfaces and may rupture.

There is thus a need in the art for synthetic jet actuators which overcome these issues. In particular, there is a need in the art for synthetic jet ejectors whose operating characteristics may be periodically or continually modified or optimized. These and other needs may be met by the devices and methodologies disclosed herein and hereinafter described.

It has now been found that the aforementioned needs may be met by controlling diaphragm displacement, preferably by periodically adjusting diaphragm velocity. This approach provides a simple and easy means by which the synthetic jet actuator may be recalibrated during subsequent uses (or during a particular use) so that the device will operate at optimum performance and/or at minimum energy consumption. This approach allows the operational parameters of the synthetic jet actuator to be modified to account for differences due to aging or the environment in which the device is operating in.

The methodologies disclosed herein may be better understood with respect to the factors controlling the operation of a synthetic jet actuator. In many embodiments, the input voltage ($V_{in}$) of a moving coil actuator is equal to the sum of the voltage drop ($V_{dcr}$) across the DC resistance of the coil and the Back Electromotive Force ($B_{EMF}$). This relationship is expressed by EQUATION 1:

$$V_{in}=V_{dcr}+B_{EMF} \quad \text{(EQUATION 1)}$$

$V_{dcr}$ may itself be expressed as a function of the current input to the coil ($I_{in}$) and the voltage across the DC resistance of the actuator ($V_{dcr}$), as shown by EQUATION 2:

$$V_{dcr}=I_{in}*\text{DCR} \quad \text{(EQUATION 2)}$$

Also, $B_{EMF}$ may be expressed as a function of the magnetic field in the coil region (B), the length of the coil (L), and the velocity of the coil. This relationship is expressed by EQUATION 3:

$$B_{EMF}=B*L*v \quad \text{(EQUATION 3)}$$

The actuator diaphragm displacement is related to velocity by the simple derivative shown in EQUATION 4:

$$v(t)=dx/dt \quad \text{(EQUATION 4)}$$

If a synthetic jet actuator is driven with sinusoidal applied voltage, then the following relation holds:

$$V_{in}=A*\sin(wt) \quad \text{(EQUATION 5)}$$

wherein:

A=peak input voltage;

w=radian frequency; and t=time.

Hence, velocity may be derived by applying the derivative of EQUATION 4 to EQUATION 5:

$$V(t)=A*w*\cos(wt) \quad \text{(EQUATION 6)}$$

Ignoring phase, velocity may then be expressed as:

$$v=w*x \quad \text{(EQUATION 7)}$$

It will thus be appreciated that displacement may be controlled by controlling velocity. Consequently, for sinusoidal inputs, velocity is a linear function of frequency. It follows that $$B_{EMF}=V_{in}-I_{in}*\text{DCR}=B*L*v \quad \text{(EQUATION 8)}$$

In light of the foregoing, and with reference to FIG. 1, a simple method of displacement control may be implemented involving an initial calibration at the factory, and subsequent recalibration in the field. In accordance with this method, the coil DC resistance (DCR) is measured (401). The actuator drive voltage is then adjusted (403) to achieve the desired displacement at the desired frequency. It may be necessary to use a position, velocity or acceleration sensing mechanism (such as, for example, an accelerometer) located internal or external to the synthetic jet actuator for this purpose. The input current ($I_{in}$) and voltage ($V_{in}$) are then measured (405), after which the Back Electromotive Force ($B_{EMF}$) may be computed (407) from EQUATION 8. The $B_{EMF}$ value so calculated may then be stored (409) as a target value in a memory device associated with the actuator drive electronics.

Figure 2:
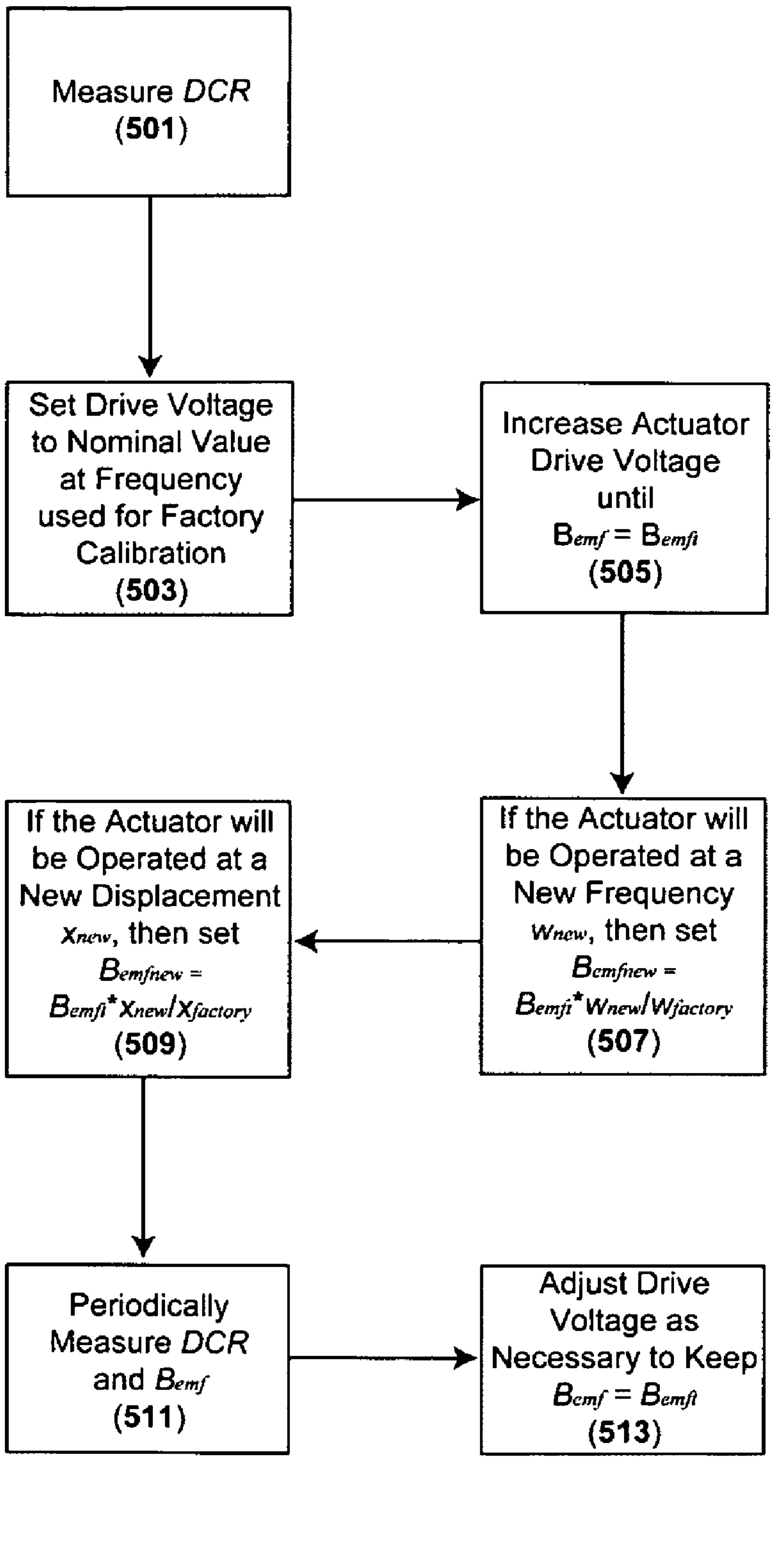
FIG. 2 is a flow chart illustrating a particular, non-limiting embodiment of a method in accordance with the teachings herein.

Referring now to FIG. 2, a simple method of displacement control may then be implemented during subsequent power-ups of the synthetic jet actuator in the field. First, the DCR may be measured (501). The drive voltage may then be set (503) to some small value and at the frequency used in the factory for calibration. The actuator drive voltage may then be slowly increased while intermittently or continuously measuring (505) the $B_{EMF}$ of the actuator until $B_{EMF}=B_{EMFT}$. At this drive condition, the velocity and the displacement will be at the same amplitudes as set in the factory.

If it is desired to operate at another frequency, then the $B_{EMFT}$ may be adjusted (507) such that $$B_{EMFnew}=B_{EMFT}*w_{new}/w_{factory} \quad \text{(EQUATION 9)}$$

where $B_{EMFnew}$=the $B_{EMF}$ target at the new frequency;

$w_{new}$=the new frequency;

$w_{factory}$=the frequency at which factory calibration was performed.

If it is desired to operate at a different displacement, then the $B_{EMFT}$ should be adjusted (509) such that $$B_{EMFnew}=B_{EMFT}*x_{new}/x_{factory} \quad \text{(EQUATION 10)}$$

where $B_{EMFnew}$=the $B_{EMF}$ target at the new displacement;

$x_{new}$=the new displacement; and $x_{factory}$=the displacement at which factory calibration was performed.

After the foregoing adjustments, the DCR may then be measured (511) continuously or intermittently and $B_{EMF}$ may be monitored to ensure that it stays at $B_{EMFT}$. The drive voltage may be adjusted as necessary to keep $B_{EMF}=B_{EMFT}$.

The foregoing control algorithm may be implemented with a sinusoidal drive circuit, input voltage and current measurement, and a controller comprised of digital and/or analog circuits that computes $B_{EMF}$ and adjusts actuator drive voltage and frequency. It will also be appreciated that the control algorithm will also work for other periodic waveforms aside from sinusoidal waveforms, and may even work for arbitrary waveforms with minimal information about the waveform known, as long as the relationships between velocity and displacement are defined and are either known or approximated, and as long as the $B_{EMF}$ value is derived and treated properly.

Additionally, it may be desirable in some thermal management systems to operate the actuator at or near system resonance. This will ensure that the thermal management system operates at its point of maximum power efficiency. This may be accomplished, for example, in the same controller by finding the frequency of minimum power consumption for a given displacement. This frequency shifts with time and temperature. As the resonance is tracked, the displacement is held constant with the control algorithm as described above.

Various software programs may be used to implement the foregoing methodology. The following is a particular, non-limiting example of an algorithm that may be used for this purpose.

Actuator Control Algorithm Description

At the Board Factory

Code is loaded into the board and a to-be-defined functional test is performed. Set Need_to_Factory_Cal=True [in the non-volatile memory]

At the Actuator Factory

The actuator is assembled and mounted in a test fixture. The fixture can measure actuator displacement.

```
Power is applied
            Vout remains <5mv RMS during power on reset and boot-up
            Disable actuator drive
            Enable Serial Port Interrupts
            IF (Need_to_Factory_Cal = True) THEN [do the factory cal]
            {
            Halt and wait for the test station to issue sequences of the
            following commands over the serial port:
            Set Fout [the frequency of the actuator drive]
            Set Vout [the voltage of the actuator drive]
            Measure and Report Iout [the current throug the actuator]
            Measure and Report Rdc [the DC resistance of the actuator]
            Store Fout_factory in non-volatile memory
            Store V_factory in non-volatile memory
            Store I_factory in non-volatile memory
            Store Rdc_factory in non-volatile memory
            Store Temp_factory in non-volatile memory
            Store Rdc_Tempco in non-volatile memory
            Store V_increment in non-volatile memory
            Store Error_limit in non-volatile memory
            Store Cal_interval in non-volatile memory
            Store Vmax in non-volatile memory
            Store Vmin in non-volatile memory
            Store B_Tempco in non-volatile memory
            Set Need_to_Factory_Cal = False [in the non-volatile
            memory]
            Disable actuator drive
            }
     ELSE [At every subsequent power-up]
            {
            Fout = Fout_factory
            Vout = V_factory /4
CAL
            Disable actuator drive
            Measure Rdc
            Estimate the temperature by
                   {
                   Temp =Temp_factory + Rdc_Tempco * (Rdc –
                   Rdc_factory)
                   }
            Compute the desired Back EMF at this temperature by
                   {
                   BEMF= (V_factory–I_factory * Rdc_factory) * (1 +
                   B_Tempco * (Temp –Temp_factory))
                   }
            Enable actuator drive
ADJUST      Measure Iout
            Error = (Vout –Iout * Rdc –BBEMF) / BEMF
            IF abs(Error) < Error_limit THEN GOTO RUN
            ELSE
                   {
                   IF Error> 0 THEN
                        {
                        Vout = Vout – V increment
                        IF Vout < Vmin THEN
                             {
                             Vout = Vmin
                             GOTORUN
                             }
                        ELSE GOTO ADJUST
                        }
                   ELSE
                        {
                        Vout = Vout + V increment
                        IF Vout > Vmax THEN
                             {
```

-continued

```
                        Vout=Vmax
                        GOTORUN
                        }
                    ELSE GOTO ADJUST
                    }
                }
RUN         Enable Serial Port Interrupts
            Wait Cal Interval seconds
            GOTOCAL
            }
```

Some of the foregoing methodologies utilize $B_{EMF}$ to detect a quantity which is proportional to diaphragm displacement. In some embodiments of the methodologies described herein, $B_{EMF}$ may be detected through the use of a second coil which is wound around the coil former of the synthetic jet actuator. This second coil may be co-wound with the motor coil, disposed next to the motor coil, or placed on top of or around the motor coil. The voltage, present at the detection coil while the actuator is moving, is the pure $B_{EMF}$ signal which can then be processed for control purposes.

In some embodiments of this type, one can use two or more coils placed next to the motor coil to detect offsets in the motion of the coil or diaphragm. Alternatively, the $B_{EMF}$ signal acquired from the driving coil as described earlier can be combined with the detection coil signal to detect abnormalities in the motion of the coil or diaphragm, to detect offsets, or for other such purposes.

The embodiments described herein which utilized $B_{EMF}$ as a quantity which is proportional to diaphragm displacement typically require a calibration procedure, since $B_{EMF}$ typically varies from device to device. This calibration procedure may involve the use of a system having laser displacement sensors to measure diaphragm displacement and to adjust the $B_{EMF}$ target values accordingly to achieve the desired stroke length of the actuator. In some embodiments, the actuator may be shaken along its axis of motion such that the inertia of the diaphragm will cause it to deflect from its rest position so as to create the desired amplitude on the device to be calibrated. The actuator then acts as a generator and will produce the pure $B_{EMF}$ voltage on its leads. This voltage may then be measured and used as a reference.

In a variation of the foregoing methodology, rather than shaking the actuator along its axis of motion, air or another suitable fluid may be used to displace the diaphragm of the actuator. This may be accomplished, for example, by using an audio speaker or driven piston of appropriate size to generate a fluid pressure that varies over time sinusoidally and which is of the desired frequency, and creates the desired amplitude, on the diaphragm of the actuator to be calibrated. When the pressure wave is applied to the diaphragm, the actuator acts as a generator and will produce the pure $B_{EMF}$ voltage ($V_{EMF}$) on its leads. This $V_{EMF}$ may then be measured and used as a reference. Depending on the calibration method utilized, this method would also allow the actuator to be calibrated to a certain air flow. Moreover, this method does not require optical access to the diaphragm for a laser measurement. In order to obtain feedback of the diaphragm displacement, fiber optics (or conventional optics with appropriate image acquisition systems) may be utilized to look at the coil or other moving parts (this may be accomplished by looking through the nozzles of the device). A gauge print may be provided on the coil or other moving parts of the device for this purpose.

As described herein, $B_{EMF}$ gives an indication of diaphragm displacement, and can be used in a control system to maintain specified displacement while the surround-diaphragm "spring constant" changes with temperature or age. In such applications, the control system typically reads the current $B_{EMF}$, and then adjusts the drive to move back to the specified $B_{EMF}$ and displacement.

However, this procedure can become complicated when a synthetic jet ejector is driven by two or more actuators. This may occur, for example, when two or more actuators share a common air cavity, as may be the case, for example, in a dual actuator housing assembly in which the backsides of the actuators face each other, and in which the actuators drive air from the same cavity out of the jet ports. In such applications, $B_{EMF}$ may be determined by selectively switching off the drive to one of the actuators while continuing to drive the other actuator. The $B_{EMF}$ associated with the deactivated actuator may then be measured, and the procedure may be reversed to determine the $B_{EMF}$ associated with the other actuator.

As a specific example, the situation of a synthetic jet ejector equipped with first and second actuators may be considered. In this case, the drive to the first actuator may be switched off, while operation of the second actuator is maintained. The fluid in the common cavity housing the first and second actuators will couple the first and second actuators to each other. Consequently, the diaphragm of the first actuator will move, even though it is not being electrically driven. The motion of the drive coil of the first actuator through its B-field will generate $B_{EMF1}$, which may be measured with circuitry which is simpler than that required to drive the actuator and measure $B_{EMF}$ values at the same time. In an analogous manner, the second actuator may be deactivated while the first actuator is driven, thus allowing $B_{EMF2}$ to be determined.

The measured values of $B_{EMF1}$ and $B_{EMF2}$ can be related to actuator properties and drive corrections which may be applied as described above. After the periodic measurements are completed, the actuators are returned to normal operation, with both actuators being driven with corrected drive conditions.

Figure 3:
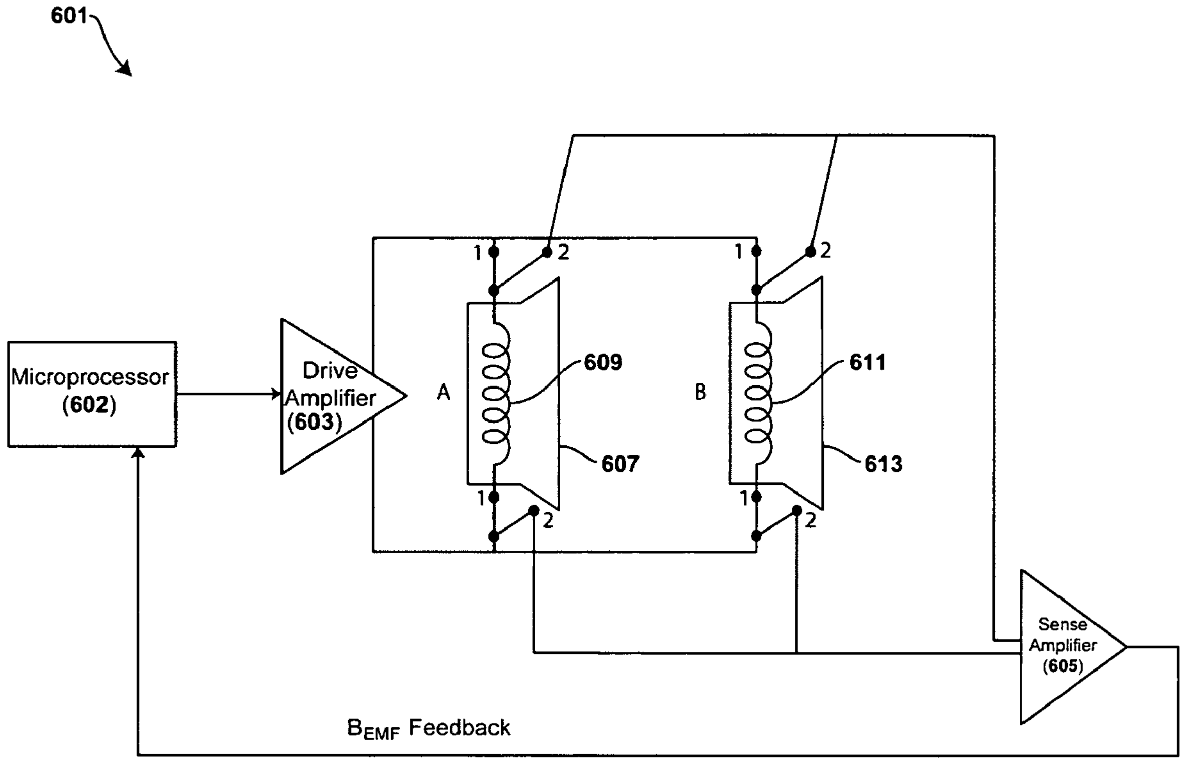
FIG. 3 is a block diagram of a particular, non-limiting configuration of circuits and switches which may be used for making $B_{EMF}$ measurements.

FIG. 3 shows a block diagram of a configuration 601 of a control system and drive system for a synthetic jet ejector made in accordance with the teachings herein. The control system includes a microprocessor 602, and the drive system includes coil actuators 609 and 611 along with FET switches which are utilized to isolate their respective actuator coils while performing the $B_{EMF}$ measurements. The sense amplifier 605 at the right of the diagram feeds a signal back to the microprocessor. In the configuration 601 depicted, the measurement $B_{EMFA}$ at coil actuator 609 (actuator A) occurs when $A_{switch}=2$ and $B_{switch}=1$, and the measurement $B_{EMFB}$ at coil actuator 611 (actuator B) occurs when $A_{switch}=1$ and $B_{switch}=2$. During normal operation (that is, when $B_{EMF}$ is not being measured), $A_{switch}=1$ and $B_{switch}=1$. It is to be noted that $A_{switch}=2$ and $B_{switch}=2$ is not a valid condition.

When $B_{EMF}$ is used as a control parameter, it is important to get a good measurement on this variable. Previously, $B_{EMF}$ as determined by $B_{EMF}=V-I*DCR$ was strongly dependent on the DCR measurement performed on a resting actuator, with three implications: (1) small disturbances negatively affected the DC measurement; (2) the measurement was electronically challenging; and (3) the process was acoustically disturbing for the listener. These issues may be addressed with the following methodology.

DC resistance can be obtained by fitting the impedence curve as a function of frequency. In many applications, it is either impossible or impractical to do full frequency chirps in order to obtain the entire curve. However, it has been found that a good approximation of the DCR resistance may be obtained by using the 10 Hz impedance number. It can be shown that this number is less than 1% off of the target value.

This approach may be further improved by using two measurements, one at 10 Hz and one at 20 Hz, and then using a parabolic fit to extrapolate the 0 Hz (=DC) resistance:

$$DCR=Z(10\text{ Hz})-(Z(10\text{ Hz})-Z(20\text{ Hz}))/3 \quad \text{(EQUATION 11)}$$

This approach is found to improve the error in resistance to a few mOhms. This improvement may also be used in manufacturing testing and in other tests that require knowledge of the DC resistance.

The choice of frequency or frequency pairs will be governed by the targeted precision of the measurement, acoustic considerations and equipment capabilities. For this method to be precise, it should only be used significantly below resonance, e.g., the Hz/20 Hz pair may be suitable for parts with resonance frequency at or above 50 Hz.

Figure 4:
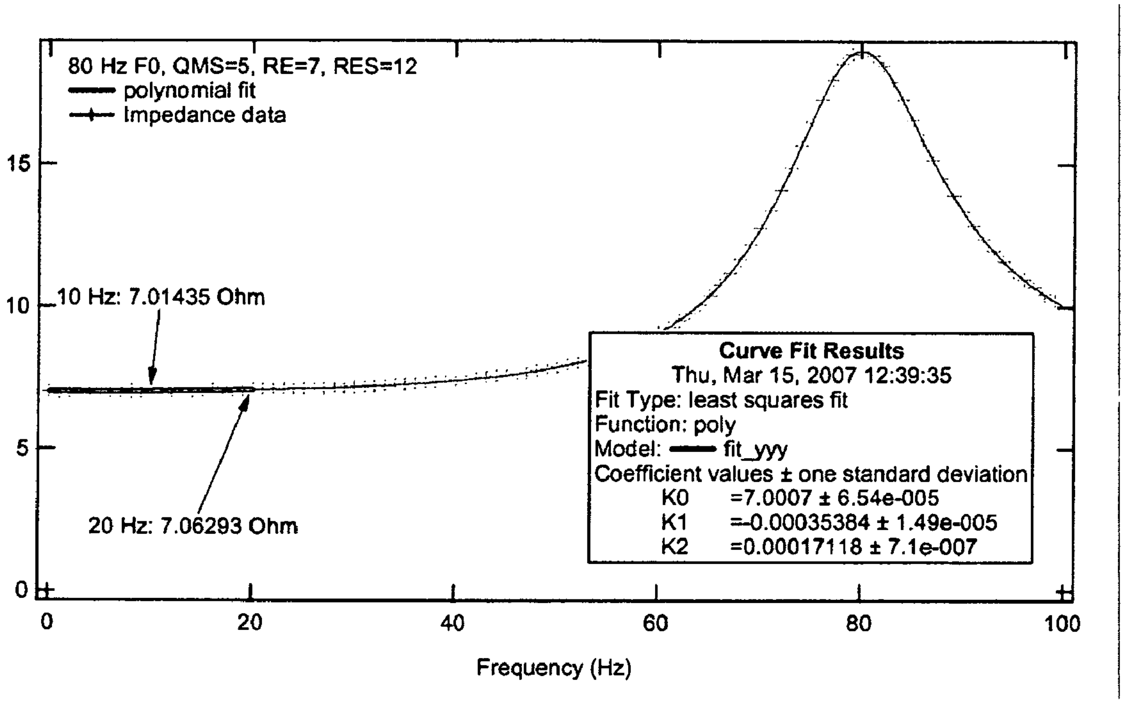
FIG. 4 is a graph of impedance (in Ohms) as a function of frequency (in Hz).

TABLE 1 shows results obtained in a resistance measurement comparison using a dynamic versus a handheld DVM method. These results are depicted graphically in FIG. 4.

TABLE 1

GSF 43 mm Impedance Measurements

| Unit | Z @ 10 Hz | Z @ 20 Hz | DCR Ohms | [0010] DCR Parabola Calc. | 10 Hz Difference (mOhm) |
|---|---|---|---|---|---|
| 60 | 6.917 | 6.99 | 7.1 | 6.89 | 24.33 |
| 58 | 6.91 | 6.988 | 7.1 | 6.88 | 26.00 |
| 188 | 6.393 | 6.489 | 6.6 | 6.36 | 32.00 |
| 207 | 6.36 | 6.448 | 6.5 | 6.33 | 29.33 |
| 123 | 6.372 | 6.453 | 6.5 | 6.35 | 27.00 |
| 142 | 6.38 | 6.478 | 6.5 | 6.35 | 32.67 |
| 125 | 6.456 | 6.531 | 6.8 | 6.43 | 25.00 |
| 135 | 6.327 | 6.492 | 6.6 | 6.27 | 55.00 |
| 148 | 6.368 | 6.454 | 6.6 | 6.34 | 28.67 |
| 7 | 6.851 | 6.933 | 7.1 | 6.82 | 27.33 |

Figure 5:
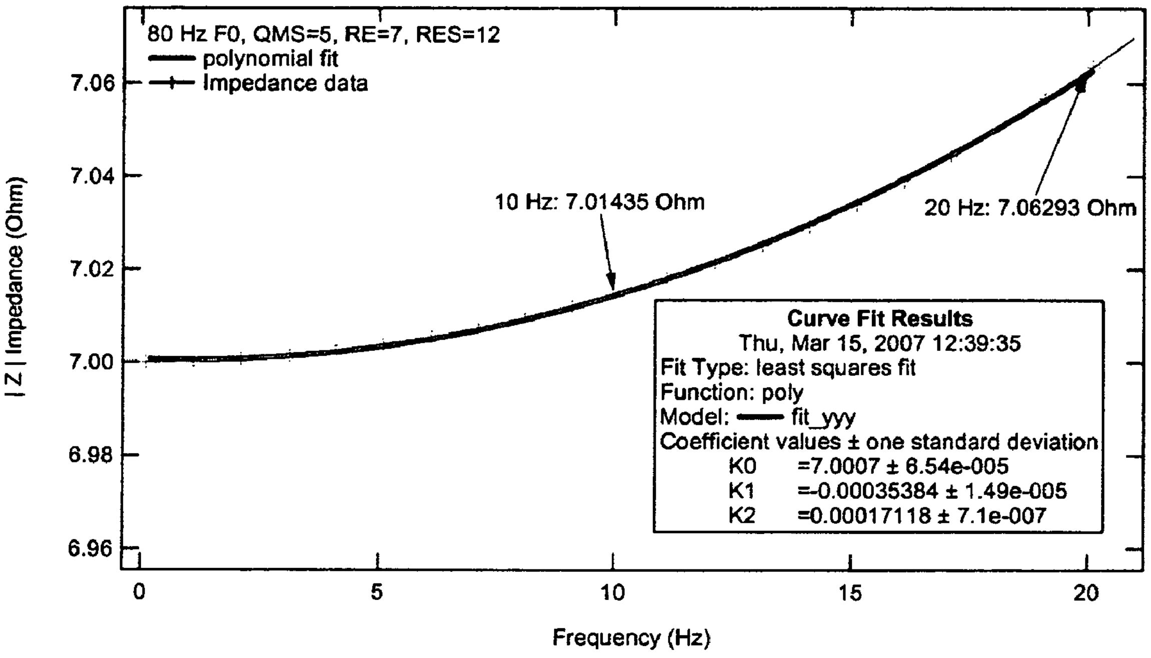
FIG. 5 is a graph of impedance (in Ohms) as a function of frequency (in Hz).
Figure 6:
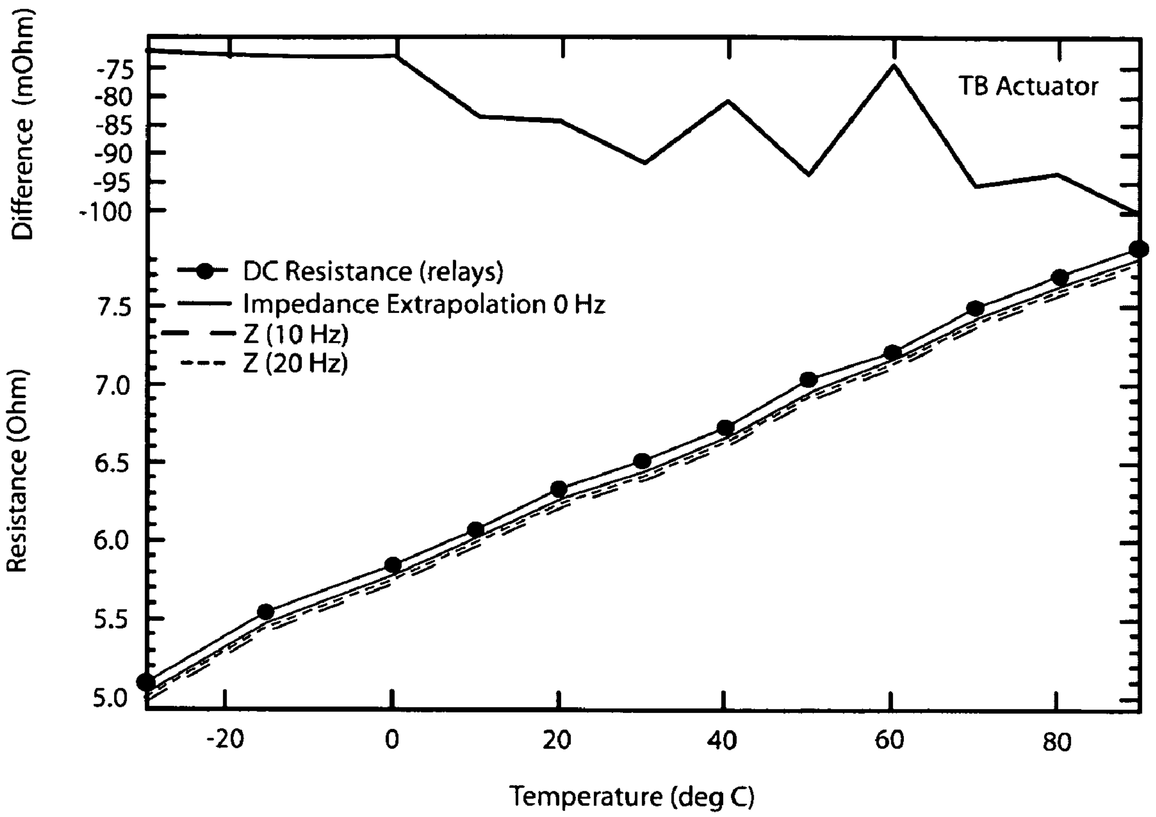
FIG. 6 is a graph of resistance (in Ohms) as a function of temperature (in ° C.).
Figure 7:
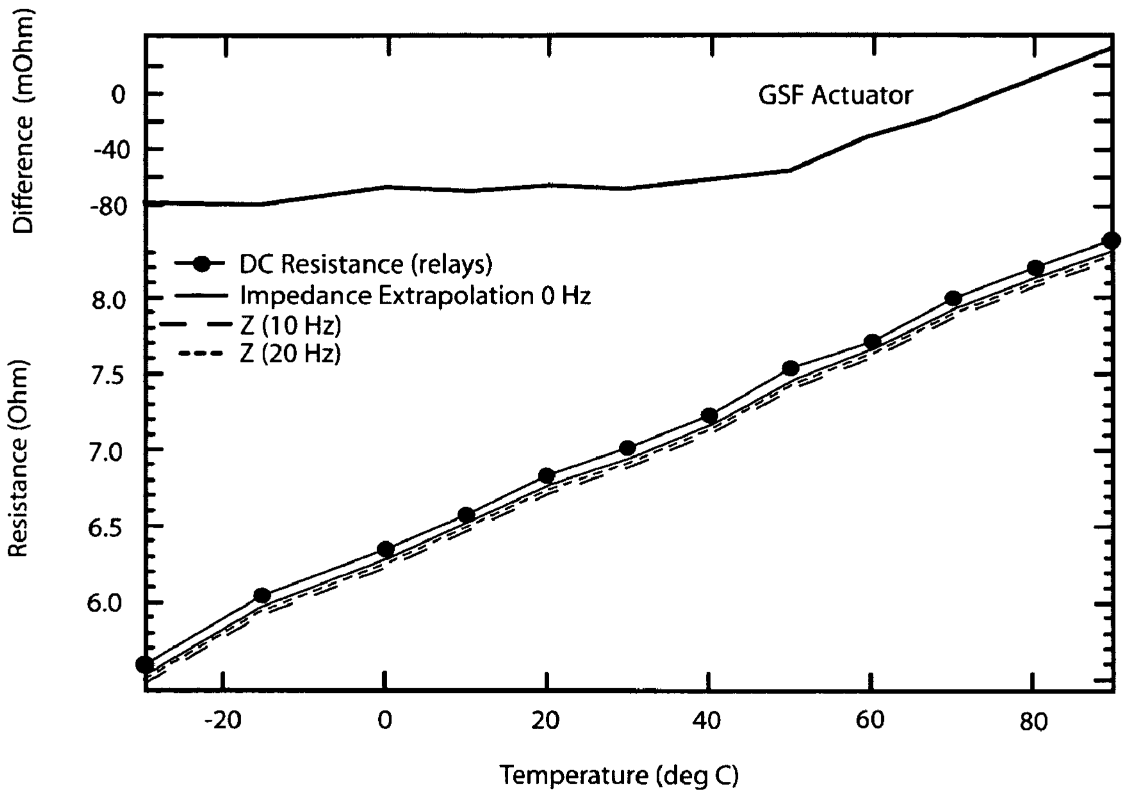
FIG. 7 is a graph of resistance (in Ohms) as a function of temperature (in ° C.).

FIGS. 5-7 depict the temperature dependent resistance measurements (impedence as a function of frequency) of two actuators. In each case, the top of the graph is the difference plot between relay switched DCR measurements and the 10/20 Hz extrapolation.

In order to utilize the dynamic measurement method for a DCR, it is necessary to superimpose a low frequency waveform onto the normal frequency voltage drive signal. If the low frequency wavelength is chosen to be an even multiple M of the normal frequency drive signal, this can be achieved by decreasing the drive signal by a constant value for M/2 normal frequency cycles, and then increasing the drive signal by the same constant value for M/2 cycles.

Measurement of the response to the low frequency waveform can be accomplished by sampling the voltage and current values multiple times during the normal frequency cycles and separately accumulating totals for the cycles when the low frequency waveform is high and low. By calculating the difference between these accumulates, and dividing voltage by current, a measurement of the low frequency signal can be extracted and used to calculate the DCR value:

$$DCR=(VSUM_{High}-VSUM_{LOW}(ISUM_{High}-ISUM_{LOW}) \quad \text{(EQUATION 12)}$$

In order to maximize synthetic jet performance, it is important to operate the air-moving actuators at the maximum possible displacement and frequency. Power consumption of a synthetic jet operating at a given displacement is a strong function of frequency.

Figure 8:
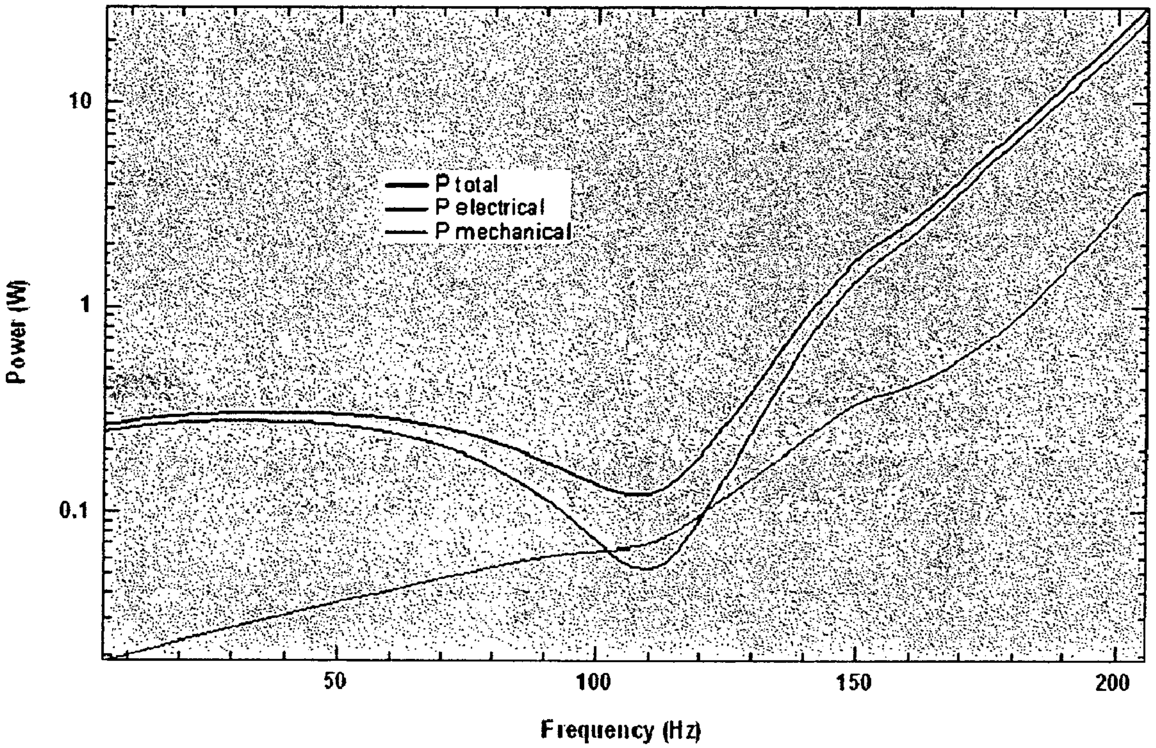
FIG. 8 is a graph of Power (in W) as a function of frequency (in Hz).

FIG. 8 depicts a typical graph of power as a function of frequency (black trace). As seen therein, there is a significant power efficiency advantage in operating at the system resonant frequency of about 110 Hz. Unfortunately, the resonant frequency is a strong function of the operating temperature and the age of the actuator.

Methods are provided herein by which the resonant frequency may be found and tracked so that, as temperature and operating conditions change, the system can always be operated at the resonant frequency. This may be achieved by utilizing the rapid change of input impedance phase that occurs at the resonant frequency.

Figure 9:
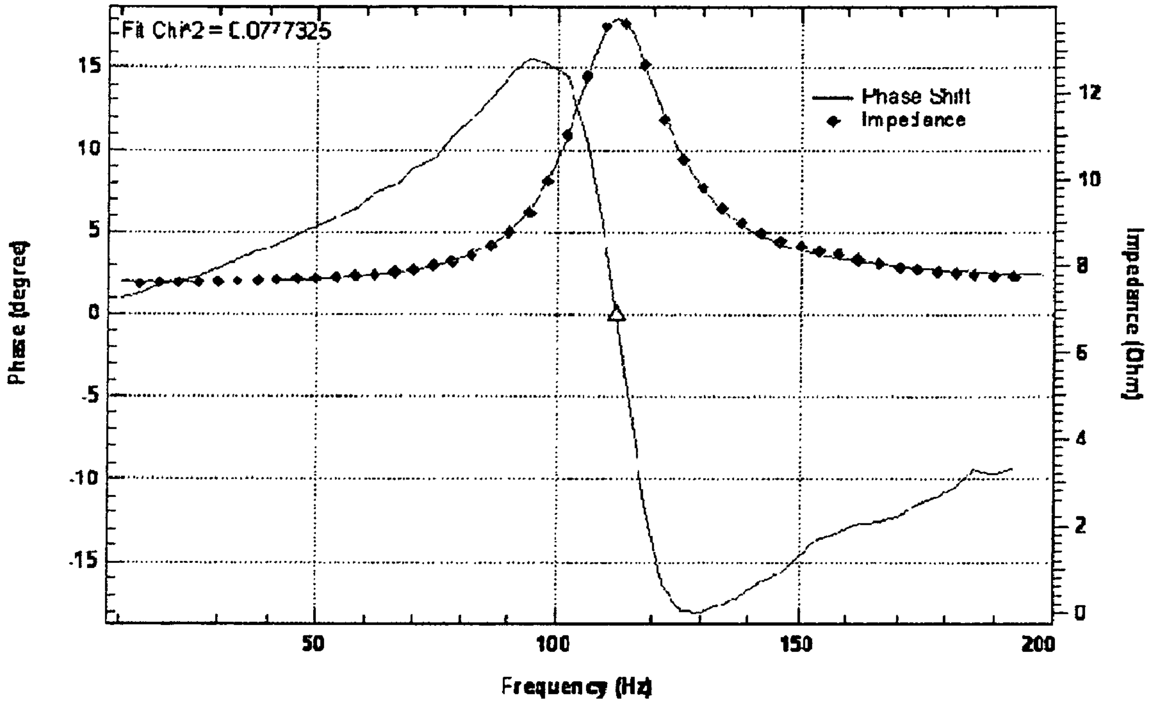
FIG. 9 is a graph of phase (in degrees) as a function of frequency (in Hz).

FIG. 9 shows the input impedance of a typical synthetic jet ejector. Note that the phase of the input impedance changes abruptly from positive to negative at resonance. Hence, resonance may be readily detected in the presence of noise by using the following algorithm:

1. Set a register equal to zero.
2. Find the time at which the input voltage crosses through zero volts, call this $t_v$.
3. Find the time at which the input current crosses through zero amps, call this $t_i$.
4. If $t_v < t_i$, then the phase is negative; otherwise, the phase is positive.
5. Increment the register if the phase is positive, decrement the register if the phase is negative.
6. Repeat steps 2 through 5 a number of times (increasing the number of times provides more accurate results).
7. If the register is positive, the phase is positive and the system is operating below resonance so the drive frequency is increased.
8. If the register is negative, the phase is negative and the system is operating above resonance, so the drive frequency is reduced.
9. Repeat steps 1 through 8 continuously to find and track resonance.

It is important as resonance is tracked to make appropriate adjustments to the $B_{EMF}$ target ($B_{EMFT}$) which the displacement control-loop is using to maintain displacement. The target is proportional to frequency, so the target must be increased or decreased as the frequency is varied.

It is also important to implement voltage, current and power limiting. The power amplifier driving the cooler should not be operated beyond its limits. If this occurs, displacement control will be lost, and/or the amplifier and/or cooler may be damaged. Limiting can be implemented in the control software by reducing the drive voltage when limit conditions are detected. This will typically happen at lower temperatures (when the cooler resonance is higher in frequency, and when the actuator suspension is stiffer/more lossy).

Figure 10:
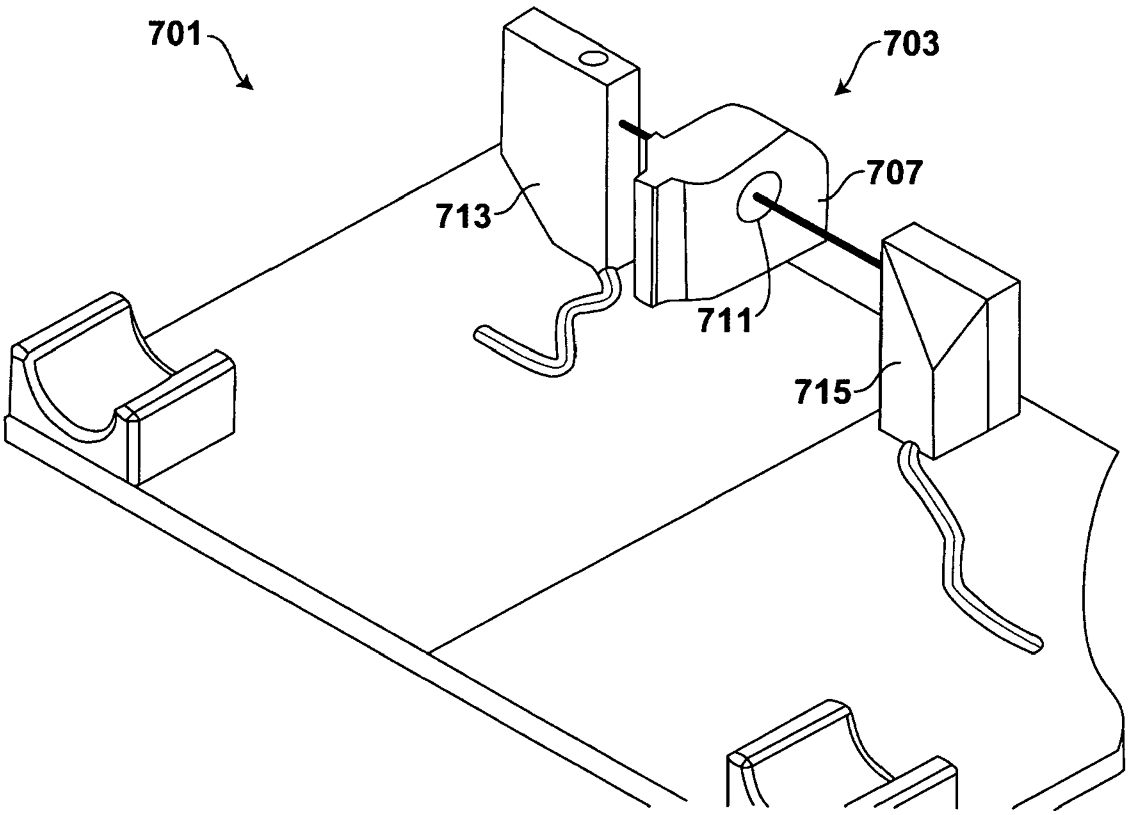
FIG. 10 is an illustration of a device for making calibration measurements on a synthetic jet ejector.

With reference to FIG. 10, a particular, non-limiting embodiment of a device 701 which may be used in accordance with the teachings herein to measure displacement is depicted. In the device shown therein, a dual actuator 703 is provided which comprises first (not shown) and second 707 actuators having respective first (not shown) and second 711 diaphragms. First 713 and second 715 lasers are provided which impinge on the first 709 and second 711 diaphragms. The device 701 of FIG. 10 may be used to measure diaphragm displacement simultaneously with the measurement of $B_{EMF}$ so that an initial calibration may be performed. This device 701 may be used to calibrate both actuators 705, 707 while they are being driven, or it may be used with one of the actuator shut off so that the $B_{EMF}$ coming out of it can be measured while diaphragm displacement is simultaneously being measured.

One difficulty encountered in measuring $B_{EMF}$ values is that synthetic jet actuators behave in a non-ideal manner. For example, it might be thought that the peak-to-peak displacement of the diaphragm as a function of frequency would be essentially linear and that, accordingly, the device could be calibrated for any displacement, thus allowing the $B_{EMF}$ to be scaled to achieve any other displacement. In practice, however, it has been found that the relationship between peak-to-peak displacement of the diaphragm and frequency is not linear. Without wishing to be bound by theory, this result is believed to arise, in part, from the non-ideality of the motor which drives the actuator. In particular, this result is believed to arise, in part, from the fact that the magnetic field associated with the moving coil of the motor does not behave in a linear fashion. Thus, as the displacement of the diaphragm increases, the magnetic force being applied to the coil does not increase in a linear fashion. Therefore, the $B_{EMF}$ falls off as the displacement continues to increase.

To compensate for this problem, a calibration algorithm is preferably utilized in the methodologies described herein which utilize a nonlinear (and preferably a polynomial) curve fitting technique. In such as approach, data is sampled at several points and is fitted with a polynomial curve. Typically, a second order polynomial is used for this purpose, although in some applications, higher order polynomials may be utilized.

Another problem encountered in the calibration process relates to the relationship between $B_{EMF}$ and voltage. In particular, for a particular $B_{EMF}$ target having an associated displacement, there may be limitations on the voltage (imposed by the electronics of the device) that may be utilized to achieve that target. For example, in a 5V system, voltage may be converted to a voltage differential so that, in theory, 10V can be used to achieve a $B_{EMF}$ target. However, due to losses at the switches of the device and other such factors, only 8V may be available to achieve the $B_{EMF}$ target. On the other hand, as temperature increases, the diaphragm softens, thus making it easier to drive it to larger displacements. Consequently, as temperature increases, displacement and $B_{EMF}$ is affected, thus giving rise to different curves. Consequently, the $B_{EMF}$ target can be achieved at a lower voltage.

While it would be desirable in many cases to calibrate to a large $B_{EMF}$, this frequently cannot be done in practice. Consequently, in such cases, measurements are taken at other points, and the data is extrapolated to the point of interest. An appropriate curve fit (e.g., a polynomial curve fit) is utilized for this purpose which takes into account the non-ideality of the motor. Since the relationship between $B_{EMF}$ and displacement is typically not temperature dependent (or is only weakly temperature dependent), at a particular drive voltage, since displacement increases with temperature, $B_{EMF}$ also increases with temperature. Consequently, by determining the correct $B_{EMF}$ target, the correct displacement will be achieved. The voltage required to achieve that displacement will typically drop with temperature.

As discussed above, $B_{EMF}$ can be easily measured with electronic circuitry to control diaphragm velocity which, in turn, controls diaphragm displacement. $B_{EMF}$ is more typically associated with rotational motors, rather than the type of electromagnetic actuators employed in the present devices. This is because the actuators which are preferably utilized in the synthetic jet ejectors described herein are essentially audio speakers, and it is typically not necessary to control diaphragm displacement in audio speakers. By contrast, in a synthetic jet ejector, it is typically desirable to control displacement so as to achieve maximum air flow. In particular, it is desirable to move the diaphragm as close to the actuator housing as possible without actually hitting the housing. This may be achieved by using $B_{EMF}$ to control diaphragm displacement.

In some embodiments of the synthetic jet ejectors described herein, the actuators may be designed so that, even at maximum operating temperatures, the diaphragm does not contact the actuator housing. However, this approach is not preferred since it will typically mean that, at lower temperatures, maximum air flow will not be achieved.

It will be appreciated that, while the preferred methodologies disclosed herein utilize $B_{EMF}$ to determine the displacement of actuator diaphragms, other methods and devices may be utilized in the systems described herein to achieve a similar purpose. Some of these methods and devices are described below. In a typical example of these alternative approaches, some other means is used to determine diaphragm displacement, and voltage or other parameters are adjusted appropriately to maintain the maximum displacement at all times. While these alternative approaches will typically require a means for sensing the position or displacement of the diaphragm, the $B_{EMF}$ approach described above relies on features inherent in the system, and hence avoids the need for sensors or other such additional equipment.

In one possible alternative embodiment, optical sensors may be employed which may include laser diodes or photodiodes in combination with a photo sensor to sense position. In some cases, a protrusion may be placed on the diaphragm to facilitate measurements of the movements thereof. In a typical embodiment, the protrusion modulates the beam emitted by the diode such that the resulting signal generated at the sensor becomes lower and lower as more of the beam is blocked, thereby indicating the amount of the displacement. One advantage of this approach is that it automatically compensates for temperature, frequency and other such factors that may affect displacement.

Various capacitative methods could also be utilized to determine the displacement of the diaphragm. In one such approach, a plate may be placed above the diaphragm, which may or may not be in electrical communication with the coil of the actuator and/or a plate or magnet placed on the surface of the diaphragm. The difference in capacitance may then be sensed, which can be utilized to determine the extent of diaphragm displacement.

In other embodiments, pressure sensors may be utilized to determine the displacement of the diaphragm. Such sensors may operate by sensing the fluctuations in pressure within the actuator as the diaphragm moves towards, and away from, the housing.

In still other embodiments, ultrasonic methods may be used to determine the displacement of the diaphragm. These methods may include, for example, approaches similar to those utilized in ultrasonic imaging techniques, such as those based on the Doppler effect. Displacement may also be determined optically (e.g., through the use of lasers) using incident and reflected beams, and by measuring changes in the angles between the two beams.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A method for calibrating a synthetic jet ejector having an actuator equipped with an actuator coil, the method comprising:

taking a first measurement $DCR_1$ of the DC resistance of the actuator coil;

adjusting the actuator drive voltage $V_d$ to achieve a maximum displacement $x_0$ at a frequency $w_0$;

measuring the input current $I_{in}$ and input voltage $V_{in}$ required to achieve the maximum displacement $x_0$ at the frequency $w_0$;

calculating the Back Electromotive Force ($B_{EMF}$), wherein $B_{EMF}=V_{in}-I_{in}*DCR_1$;

storing the calculated value of $B_{EMF}$ in a memory device associated with the synthetic jet actuator; and using the calculated $B_{EMF}$ to calibrate the synthetic jet ejector.

2. The method of claim 1, further comprising:

taking a second measurement $DCR_2$ of the DC resistance of the actuator coil.

3. The method of claim 2, further comprising:

setting $V_d$ to a nominal value at the frequency $w_1$; and increasing $B_{EMF}$ until $B_{EMF}=B_{EMFT}$, where $B_{EMFT}$ is the Back Electromotive Force at which $x=x_1$ and $v=v_0$, wherein $v_0(t)=dx_0/dt$, wherein $x_1$ is the measured maximum displacement, and wherein v is the measured velocity.

4. The method of claim 2, wherein the actuator is adapted to operate at a frequency $w_1 \neq w_0$, wherein $B_{EMF1}$ is the value of $B_{EMF}$ at $w_1$, and wherein $B_{EMF1}=B_{EMF}*x_1/x_0$.

5. The method of claim 2, wherein the actuator is adapted to operate at a displacement $x_1 \neq x_0$, wherein $B_{EMF1}$ is the value of $B_{EMF}$ at $x_1$, and wherein $B_{EMF1}=B_{EMF}*x_1/x_0$.

6. The method of claim 1, further comprising:

periodically measuring DCR and calculating $B_{EMF}$ such that $B_{EMF}=B_{EMF0}$.

7. The method of claim 6, wherein $B_{EMF}$ is calculated from DCR in accordance with the equation $B_{EMF}=V_{in}-I_{in}*DCR$.

8. The method of claim 1, wherein the input current $I_{in}$ and input voltage $V_{in}$ are measured at $x_0$ and $w_0$.

9. A method for calibrating a synthetic jet ejector, comprising:

providing a synthetic jet ejector equipped with a coil, wherein the coil causes a diaphragm to vibrate about a first axis which is perpendicular to a major surface of the diaphragm;

applying a periodic force such that the diaphragm is deflected from a resting position to a maximum displacement $d_0$ along the first axis, wherein $d_0$ is equal to the desired maximum displacement of the diaphragm during operation of the synthetic jet ejector;

measuring the electromagnetic force voltage across the coil; and using the measured electromagnetic force to calibrate the synthetic jet ejector.

10. The method of claim 9, wherein the periodic force moves the synthetic jet ejector along the first axis.

11. The method of claim 9, wherein the coil is an actuator coil, and wherein the electromagnetic force voltage is measured across the leads of the coil.

12. The method of claim 9, wherein the periodic force is created by shaking the synthetic jet ejector.

13. The method of claim 12, wherein the synthetic jet ejector is shaken along the first axis.

14. A method for determining the Back Electromotive Force ($B_{EMF}$) in a coil of a synthetic jet ejector, comprising:

providing a synthetic jet ejector equipped with a first coil, wherein the first coil causes a diaphragm to vibrate about a first axis which is perpendicular to a major surface of the diaphragm;

providing a second coil; and using the second coil to determine $B_{EMF}$;

wherein the $B_{EMF}$ is determined by utilizing the second coil to determine the $B_{EMF}$ voltage across the first coil.

15. The method of claim 14, wherein the first and second coils are co-wound.

16. The method of claim 14, wherein the first and second coils are wound about a common axis.

17. The method of claim 16, wherein the second coil has a larger average diameter than the first coil.

18. The method of claim 16, wherein the second coil has a larger minimum diameter than the first coil.

19. The method of claim 16, wherein the second coil is vertically disposed along the first axis with respect to the first coil.

20. The method of claim 14, further comprising a third coil, wherein the second and third coils are used to determine $B_{EMF}$.

21. The method of claim 20, wherein the first and second coils are used to detect offsets or abnormalities in the motion of the first coil.

22. A method for determining Back Electromotive Force ($B_{EMF}$) in a synthetic jet ejector having first and second actuators, comprising:

deactivating the first actuator while operating the second actuator, thereby placing the synthetic jet ejector into a first operational state;

determining the Back Electromotive Force ($B_{EMF1}$) of the first actuator while the synthetic jet ejector is in the first operational state;

deactivating the second actuator while operating the first actuator, thereby placing the synthetic jet ejector into a second operational state; and determining the Back Electromotive Force ($B_{EMF2}$) of the second actuator while the synthetic jet ejector is in the second operational state.

23. The method of claim 22, wherein the first and second actuators are disposed in a common housing.

24. The method of claim 22, wherein the first and second actuators are equipped with first and second drive coils, and wherein $B_{EMF1}$ and $B_{EMF2}$ are determined using a third coil.

25. The method of claim 22, wherein the measured values of $B_{EMF1}$ and $B_{EMF2}$ are used to modify drive characteristics of the first and second actuators.

26. The method of claim 22, wherein the measured values of $B_{EMF1}$ and $B_{EMF2}$ are used to modify the operational characteristics of the synthetic jet ejector.

* * * * *